United States Patent

Kosker

[15] 3,647,307

[45] Mar. 7, 1972

[54] BORING BAR

[72] Inventor: Leon G. Kosker, Latrobe, Pa.

[73] Assignee: Kennametal Inc., Latrobe, Pa.

[22] Filed: Dec. 2, 1969

[21] Appl. No.: 881,569

[52] U.S. Cl. ........................................... 408/181, 408/153
[51] Int. Cl. .................................................. B23b 29/034
[58] Field of Search ................... 82/36; 77/58 C, 58 J, 58 K;
408/153, 181, 184, 185

[56] References Cited

UNITED STATES PATENTS

| 500,954 | 7/1893 | Rundquist | 82/36 |
|---|---|---|---|
| 2,201,495 | 5/1940 | Miller | 77/58 J |
| 2,251,413 | 8/1941 | Munkebo | 77/58 J |
| 2,382,571 | 8/1945 | Kylin | 77/58 K |
| 2,812,672 | 11/1957 | Sainati et al. | 77/58 J |
| 3,014,391 | 12/1961 | Fuhrman | 77/58 J |
| 3,286,562 | 11/1966 | Curran | 82/36 |
| 3,289,273 | 12/1966 | Artand | 77/58 C |
| 3,296,897 | 1/1967 | Konwal | 77/58 C |
| 3,533,312 | 10/1970 | McCreery | 77/58 K |

*Primary Examiner*—Gerald A. Dost
*Attorney*—Melvin A. Crosby

[57] ABSTRACT

The invention relates to a boring bar made up of a shank or bar member and a head member mounted on the outer end thereof and adapted for detachably supporting a cutting insert. The head member is adjustable on the bar member in a direction substantially perpendicular to the top surface of the cutting insert over which chips flow during a cutting operation.

5 Claims, 6 Drawing Figures

PATENTED MAR 7 1972 3,647,307
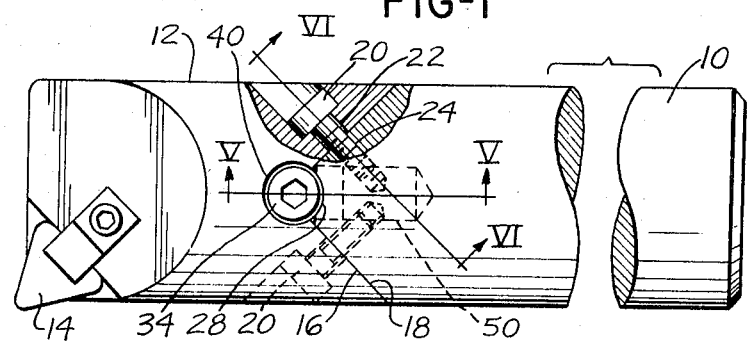
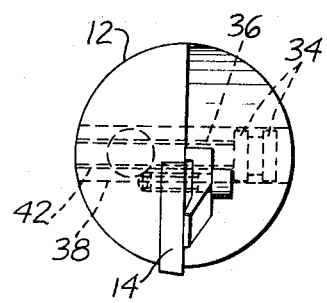
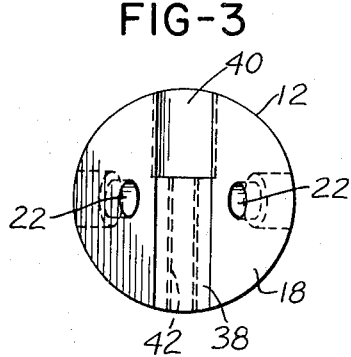
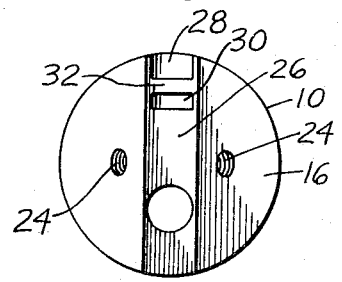
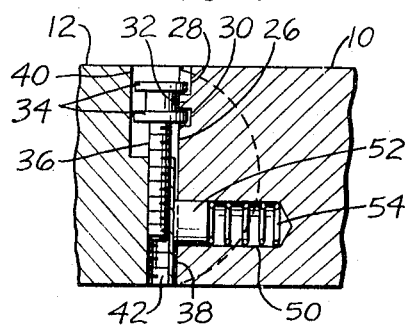
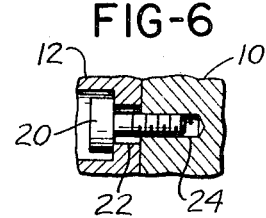
INVENTOR.
LEON G. KOSKER
BY

BORING BAR

The present invention relates to boring bars and in particular to boring bars having a head thereon carrying a cutting insert and adjustable in a direction substantially perpendicular to the plane of the cutting insert.

Boring bars are known in which the head carrying the cutting insert is adjustable substantially in the plane of the cutting insert so as to adjust the diameter of the hole being cut by the boring bar. However, it sometimes occurs that the cutting insert carried by the bar is not at the proper level with respect to the surface being cut and adjustment of the boring bar to compensate for such improper positioning has heretofore been extremely difficult. Such adjustment of the level that the cutting insert engages the work is important for controlling the rate of cutting, the quality of the finish being produced, and to control the clearance between the side of the cutting insert and the surface being machined.

With the foregoing in mind, it is a primary object of the present invention to provide a boring bar having a cutting insert thereon and wherein the cutting insert is adjustable relative to the axis of the boring bar in a direction substantially perpendicular to the plane of the cutting insert.

Another object of this invention is the provision of a boring bar having a cutting insert supporting head thereon wherein the head is adjustable on the bar in a direction perpendicular to the plane of the cutting insert carried by the head.

Still another object of the present invention is the provision of a boring bar of the nature referred to above in which the bar is relatively simple to manufacture and which remains rigid after being adjusted into position and which is relatively easy to adjust.

The foregoing objects as well as still other objects and advantages of the present invention will become more apparent upon reference to the following detailed description, taken in connection with the accompanying drawings, in which:

FIG. 1 is a plan view, partly broken away, and showing a boring bar constructed according to the present invention;

FIG. 2 is an elevational view looking in at the left end of FIG. 1;

FIG. 3 is a view looking in at the right side of the head portion of the bar of FIG. 1;

FIG. 4 is a view looking in at the left end of the portion of the bar to which the head is attached;

FIG. 5 is a vertical sectional view indicated by line V—V on FIG. 1; and

FIG. 6 is a sectional view indicated by line VI—VI on FIG. 1.

BRIEF SUMMARY OF THE INVENTION

The present invention relates to a boring bar having an adjustable head on the outer end thereof and which head is adapted for supporting a cutting insert. The head is adjustable on the bar in a direction substantially perpendicular to the plane of the cutting insert and this is accomplished by forming the end of the head opposite the cutting insert to a V-shape and then forming the end of the supporting bar on which the head is mounted to a corresponding V-shape with the apices of the said V-shapes extending perpendicular to the plane of the cutting insert.

An adjusting screw is carried by one of the parts and engages the other part for effecting relative adjustment therebetween and clamp screws extending through one of the said parts and threaded into the other part are provided for clamping the parts of the bar in adjusted positions.

There is preferably a friction element carried by one part and resiliently engaging the other part of the bar assembly to prevent relative movement between the parts when the clamp screws are loosened so that reliable relative adjustment of the parts can be made by the adjusting screw.

DETAILED DESCRIPTION

Referring to the drawings more in detail, in FIG. 1, 10 is a supporting part in the form of an elongated bar portion, which may be steel or cemented carbide, and 12 is a steel head part adjustably mounted on the supporting part. Supporting bar part 10 is adapted for being clamped in a spindle or tool holder for presenting a cutting insert 14 carried by the head part to a workpiece. It is usually the workpiece which rotates but it is also possible to rotate the boring bar to cause the cutting insert to cut the surface to which it is presented, usually the surface of a cylindrical bore.

According to the present invention the outer end of support part 10 has a convex V-shaped configuration 16 and the end of part 12 opposite insert 14 has a concave V-shape 18. The surfaces of the V-shapes, or configurations, which engage each other are machined so as to be flat and parallel so that parts 10 and 12 have a good bearing on each other. Clamp screws 20 are provided and extend through holes 22 in part 12 and are threaded into the threaded bores 24 in part 10. The holes 22 are elongated in the direction of the length of the V-shaped formations, which is in the direction perpendicular to the plane of insert 14 so that head part 12 is adjustable on supporting bar part 10 in a direction perpendicular to the plane of cutting insert 14.

As will be seen in the drawings, the apex of the V-shaped configuration on the head end of the bar part 10 is cut off so as to present a flat region 26. Near one end of region 26 are arcuate recesses 28 and 30 defining therebetween the rib 32. Rib 32 is adapted for engaging the space between the flanges 34 on an adjusting screw 36.

The bottom of the V-shaped groove in part 12 is similarly cut off so as to have a flat region 38 which is parallel to and slightly spaced from the aforementioned flat region 26 as will be seen in FIG. 5. Toward one end of flat region 38, a partial bore 40 is formed into which the flanged end of adjusting screw 36 fits with a small amount of clearance. Furthermore, a threaded bore 42 is provided in part 12 closely adjacent the flat region 38 as will be seen in FIG. 5. The arrangement is such that when adjusting screw 36 is threaded into bore 42, part 12 can be assembled with part 10 and with rib 32 being engaged on its opposite sides by ribs 34 of adjusting screw 36. Rotation of screw 36 will thus provide for relative adjustment of parts 10 and 12 in the direction of the axis of screw 36 which is, as will be seen, in a direction substantially perpendicular to the plane of cutting insert 14.

When parts 10 and 12 are assembled in the aforesaid manner, with screw 36 adjusted to a certain position in its threaded bore 42, clamp screws 20 can be inserted through holes 22 in part 12 and threaded into threaded holes 24 in part 10. The clamp screws can be loosened to permit relative adjustment of the parts within the limits determined by the amount of elongation of holes 22, and can be drawn up tight for fixedly clamping the parts together.

Relative movement between parts 10 and 12, when screws 20 are loosened to permit relative adjustment of the parts, is prevented by friction plug S2, nylon, for example disposed in a bore 50 in part 10 which opens through flat region 26 therein. The plug is urged toward part 12 by a relatively stiff compression spring 54. By the provision of this friction element, the amount of adjustment of the head part of the bar on the support portion thereof can readily be determined because no shifting of the parts relatively occurs merely by the loosening of clamp screws 20.

What is claimed is:

1. In a boring bar; an elongated bar member, a head member mounted on one end of said bar member and adapted for supporting a cutting insert, said members at their adjacent ends having interfitting regions forming a guideway for adjustment of said head member on said bar in a predetermined direction transverse to the axis of said bar member, and means on said head member forming a seat for a cutting insert, said seat being adapted for receiving a cutting insert having a substantially planar surface over which chips flow during a cutting operation, said planar surface being disposed substantially perpendicular to said predetermined direction, said interfitting regions comprising a V-shape form on the side adjacent end of one of said members and a complimentarily shaped notch formed on the said adjacent end of the other of said members.

2. A boring bar according to claim 1 which includes threaded bores in said one member extending therein through the surfaces of said V-shape, and slots on the other member having their length extending in the said predetermined direction, and screws extending through said slots into said threaded bores and operable to clamp said members together in adjusted positions.

3. A boring bar according to claim 2 which includes cooperating elements of an adjusting means interconnecting said members for relative adjustment thereof in said predetermined direction.

4. A boring bar according to claim 3 which includes friction means carried by one of said members and resiliently urged into engagement with the other of said members to inhibit movement between said members except when caused by actuation of said adjusting means.

5. A boring bar according to claim 2 which includes an adjusting screw extending in said predetermined direction and threaded into one of said members and engaging the other of said members so as to be rotatable relative thereto but nonaxially moveable relative thereto.

* * * * *